April 20, 1937.   H. J. EASTMAN   2,077,381
CALIBRATING AND TESTING TOOL FOR BORE HOLE SURVEYING INSTRUMENTS
Filed May 24, 1935   3 Sheets-Sheet 1
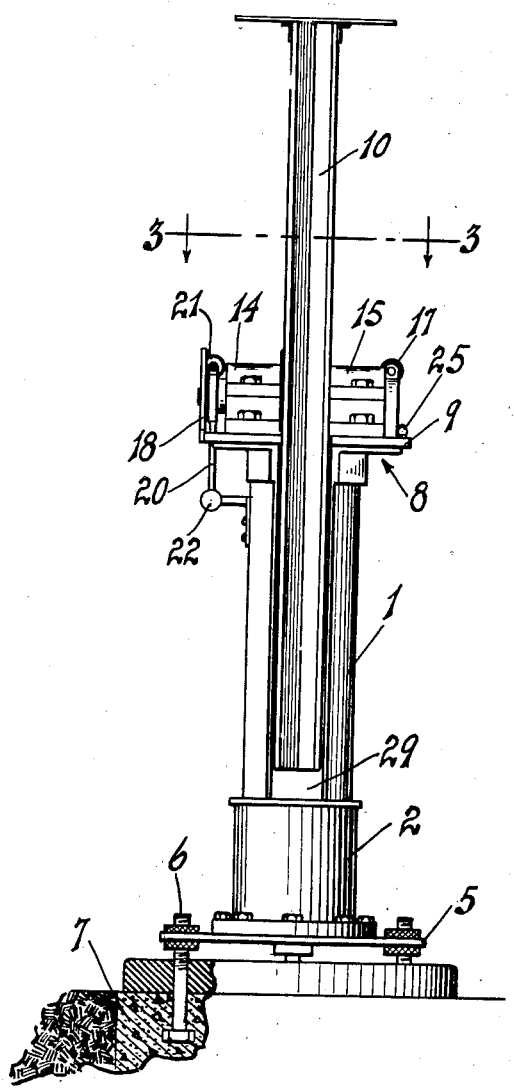
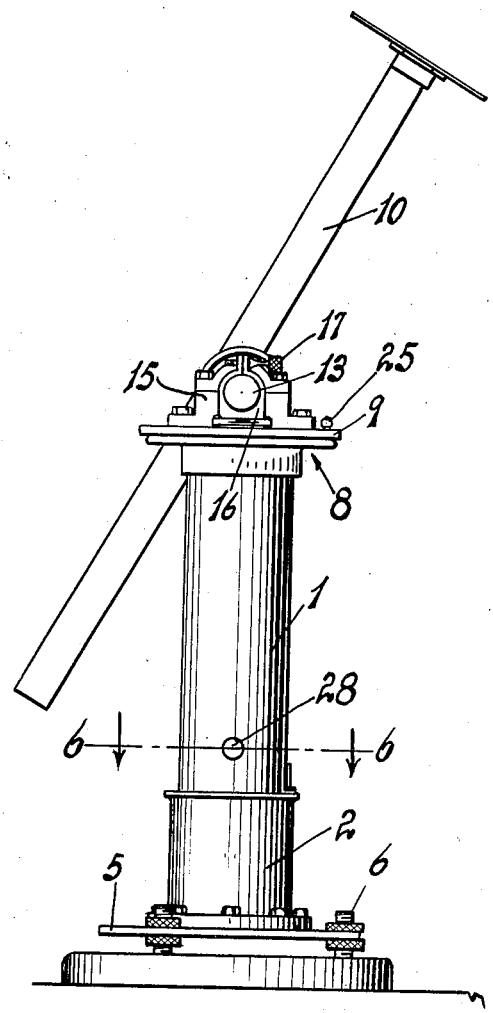
INVENTOR.
HARLAN JOHN EASTMAN.
BY
ATTORNEY.

April 20, 1937. H. J. EASTMAN 2,077,381
CALIBRATING AND TESTING TOOL FOR BORE HOLE SURVEYING INSTRUMENTS
Filed May 24, 1935 3 Sheets-Sheet 2

INVENTOR.
HARLAN JOHN EASTMAN.
BY
ATTORNEY.

April 20, 1937.  H. J. EASTMAN  2,077,381
CALIBRATING AND TESTING TOOL FOR BORE HOLE SURVEYING INSTRUMENTS
Filed May 24, 1935  3 Sheets-Sheet 3

INVENTOR.
HARLAN JOHN EASTMAN.
BY
ATTORNEY

UNITED STATES PATENT OFFICE 2,077,381

CALIBRATING AND TESTING TOOL FOR BORE HOLE SURVEYING INSTRUMENTS

Harlan John Eastman, Long Beach, Calif.

Application May 24, 1935, Serial No. 23,263

7 Claims. (Cl. 33—69)

This invention relates to a calibrating and testing tool for bore hole surveying instruments whereby the declination and direction scales of the instrument may be calibrated or tested.

An object of my invention is to provide a tool in which the bore hole surveying instrument is placed, portions of the tool bearing the instrument being capable of rotation in both vertical and horizontal planes in order that the inclination and direction scales of the instrument can be calibrated or checked.

Another object is to provide a calibrating and testing tool of the character stated in which the rotation of the drill pipe can be simulated for the purpose of testing the response of the instrument to the rotating movement.

Still another object is to provide a testing tool of the character stated which is simple in operation and which will effectively hold and test the instrument under various conditions.

Other objects, advantages and features of invention may appear from the accompanying drawings the subjoined detailed description, and the appended claims.

In the drawings:

Figure 1 is a front elevation of my calibrating and testing tool.

Figure 2 is a side elevation of the same.

Figure 3:
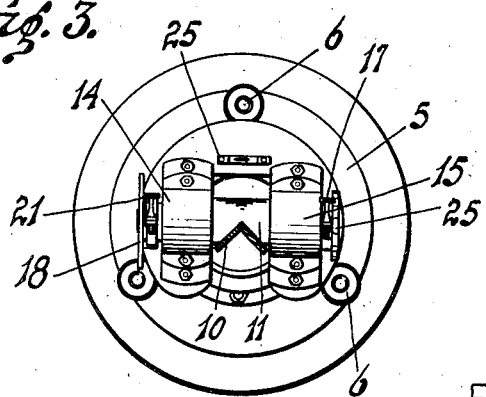
Figure 3 is a sectional view taken on line 3—3 of Fig. 1.
Figure 4:
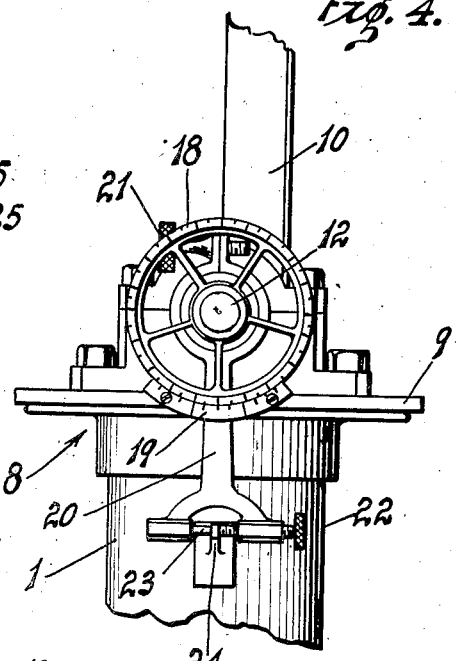
Figure 4 is an enlarged fragmentary side elevation of the tool head showing the vertical protractor.
Figure 5:
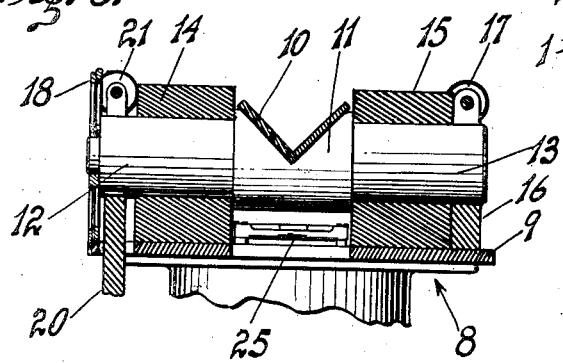
Figure 5 is a fragmentary transverse sectional view thru the head of the tool.
Figure 6:
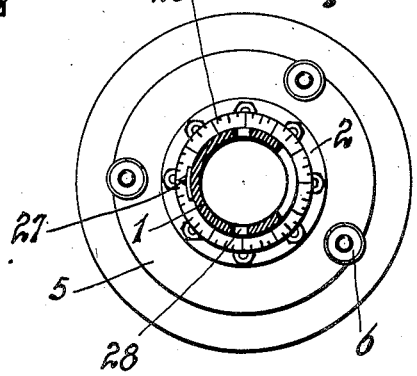
Figure 6 is a sectional view taken on line 6—6 of Fig. 2.
Figure 7:
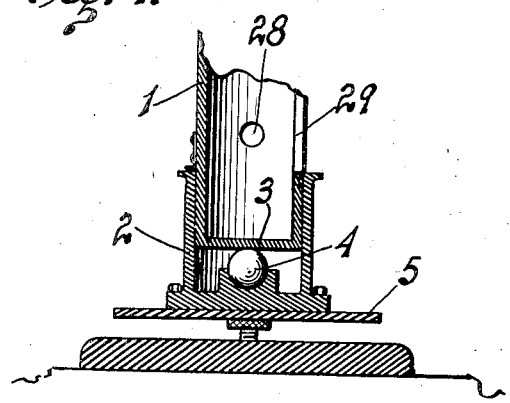
Figure 7 is a fragmentary vertical sectional view of the base of the tool.

Referring more particularly to the drawings, the numeral 1 indicates a tubular stand which is closely journaled in a collar 2 forming a portion of the base. The bottom of the stand 1 is closed by a wall, as shown at 3, and this wall rests upon a ball bearing 4 which bearing is mounted in the bottom of the collar 2. Since the stand 1 is accurately journaled in the collar 2 and rests upon the bearing 4, it will be evident that the stand can be rotated in the collar 2 for a purpose to be further described.

The collar 2 is rigidly attached to a level plate 5. The center line of collar 2 and level plate 5 are mounted so as to be in planes perpendicular to each other. A plurality of anchor bolts 6, threaded at the upper end, are firmly set in the permanent base 7 on which the tool is to be mounted. These anchor bolts extend thru corresponding holes in level plate 5. By means of opposing round knurled nuts, collar 2 may be adjusted so its longitudinal axis is vertical. The upper nuts prevent the tool from overturning.

A head 8 is affixed to, or formed upon the upper end of the stand 1. The head 8 includes a table 9 fixedly secured thereto. The table 9 lies in a plane perpendicular to the longitudinal axis of the stand 1. A V-shaped trough 10 is pivotally mounted on the table 9 in a manner so that it can be moved from a vertical position as shown in Fig. 1, to a substantially horizontal position, i. e., the trough can be swung in a vertical plane thru an angle of ninety degrees, more or less. A V-block 11 is rigidly attached to the center of the back of the trough 10. Trunnions 12 and 13, integral with block 11, are cut perpendicular to the longitudinal axis of the trough 10. The trunnions are journaled in bearings 14, 15, which bearings are rigidly attached to the top of the table 9. Thus, the trunnions lie in a plane parallel to the plane of the plate 9.

A vertical circle 18, graduated in degrees and minutes, of arc, is attached to the outer end of the trunnion 12. A vernier 19 is mounted on the edge of the table 9 for more accurately reading or setting the circle 18. Since the circle 18 moves with the trunnion 12, the inclination of the trough 10 is indicated by the reading of the circle and vernier.

The method of setting and holding the inclination of the trough 10 is similar to that used on a land surveying transit. The split circle and arm 20 are clamped to the trunnion 12 by the knurled clamp screw 21. Slow motion screw 22 acts against the lug 24 (which is rigidly attached to the stand 1) and is opposed by a spring pressed pin 23, thus providing slow motion movement of the trough 10 in a vertical plane.

An auxiliary clamp 16 is tightened about the trunnion 13 by means of a knurled clamp screw 17. Since the body of the clamp 16 is rigidly attached to the bearing 15, this auxiliary clamp prevents the vertical movement of the trough 10. The auxiliary clamp is used to insure that the inclination setting of the trough 10 is not disturbed when the tool is in use. The auxiliary clamp must be loosened to reset the inclination.

A circular collar 26, graduated in degrees of arc, is adjustably mounted on the upper edge of the collar 2. It may be rotated horizontally and clamped in any desired position. The pointer 27 which is fixed to the stand 1, moves over these graduations when the stand 1 is rotated about its longitudinal axis, indicating the direction (azimuth or bearing from a given reference mark) of the longitudinal axis of the trough 10. Holes 28 in the stand permit the insertion of a bar for the purpose of rotating the stand. A vertical opening 29 is provided in the side of the stand 1 to allow the lower end of the trough 10 to pass in order that the trough may assume a vertical position.

Figure 8:
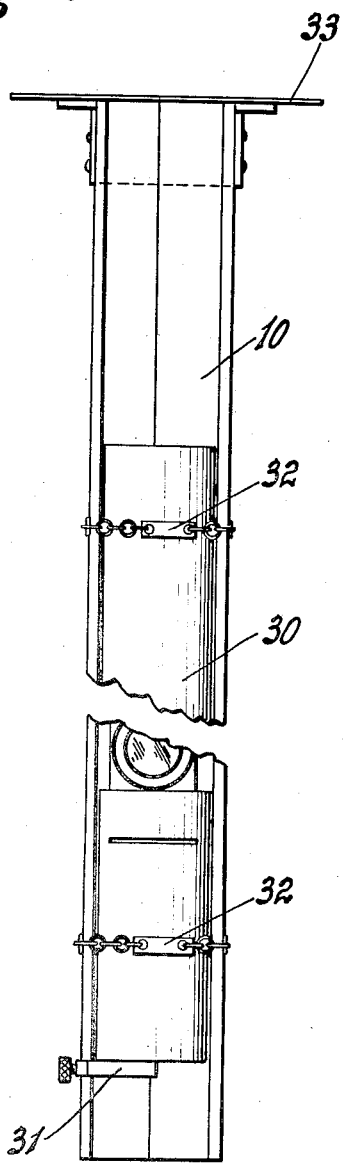
Figure 8 is a plan view of the instrument supporting trough with the instrument therein.
Figure 9:
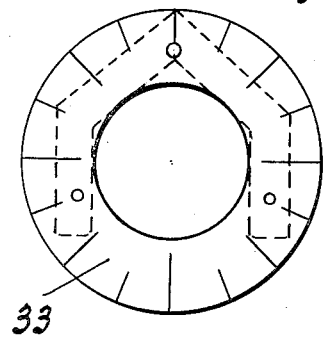
Figure 9 is an end view of the trough.

The surveying instrument 30 is clamped in the trough 10, as shown in Fig. 8. The lower end of the instrument rests against an adjustable stop 31. A plurality of spring clamps 32 encircle the trough and the instrument, thereby holding the instrument securely in position. The ring 33, calibrated in degrees, of arc is attached to the upper end of the trough 10 for the purpose of simulating the movement of the instrument when the drill pipe rotates, as will be further described. The center of this ring coincides with the longitudinal axis of the instrument being tested.

In operation, the direction of true or magnetic north (or any other desired reference azimuth) from the center of the tool is ascertained and marked in a way that it may be sighted upon thru the trough 10. By turning of the circular nuts below the level plate 5 and observation of the level bubbles 25, the tool is leveled. Thus, the longitudinal axis of the stand 1 is vertical, the trunnions 12 and 13 are horizontal and the trough 10 rotates in a truly vertical plane regardless of the rotation of the stand 1 in a horizontal plane. The upper circular nuts on the leveling screws 6 are tightened against the level plate to hold the adjustment. The trough 10 is sighted along the longitudinal axis upon the reference mark noted above. The circular collar 26 is turned until the mark opposite the pointer 27 corresponds to the reference mark graduation of the ring and the collar is clamped with the set screw. The vernier on the vertical circle is adjusted to read 0 degrees when the trough 10 is vertical. The instrument to be tested or calibrated is then placed and held in the trough 10, as shown in Fig. 8. By rotation of the trough about its horizontal axis, the inclination scale of the instrument may be calibrated or checked. By rotation of the stand, the compass scale of the instrument may be calibrated or checked. Thus, it will be evident that every position which the instrument might assume in the well can be simulated in my calibrating and testing tool, and the direction and inclination indicating means of the instrument checked or calibrated.

On certain types of surveys, where the surveying instrument is attached to the drill pipe, the pipe is allowed to rotate as it is run into the bore hole. This rotation is measured and correction for rotation is made in the computation of the survey. This rotation of the instrument itself may be simulated in my tool by rotating the instrument in the trough 10 any amount to the right or the left. The angular amount of turn is measured between a fixed mark on the instrument itself and the graduations on the ring 33. From this, the direction indicating scales may be checked for this movement.

Having described my invention, I claim:

1. A calibrating and testing tool for bore hole surveying instruments, comprising a tubular stand, a collar in which the stand is journaled, leveling means on the collar, a head on the stand, instrument supporting means pivotally mounted on the head, a vertical protractor on the instrument supporting means, and a horizontal scale on the collar whereby the angle of rotation of the stand may be determined.

2. A calibrating and testing tool for bore hole surveying instruments, comprising a tubular stand, a collar in which the stand is journalled, leveling means on the collar, a head on the upper end of the stand, a V-shaped trough, trunnions projecting from the trough, bearing blocks on the head in which the trunnions are journaled, a vertical protractor on one of said trunnions, and a horizontal scale on said collar.

3. A calibrating and testing tool for bore hole surveying instruments, comprising a tubular stand, a collar in which the stand is journaled, leveling means on the collar, a head on the upper end of the stand, a V-shaped trough, trunnions projecting from the trough, bearing blocks on the head in which the trunnions are journaled, a vertical protractor on one of said trunnions, a horizontal scale on said collar, said stand having a vertical opening in one side thereof adapted and arranged to receive the lower end of said trough, whereby the trough may be made to assume a true vertical position.

4. A calibrating and testing tool for bore hole surveying instruments, comprising a tubular stand, a collar in which the stand is journaled, leveling means on the collar, a head on the upper end of the stand, a V-shaped trough, trunnions projecting from the trough, bearing blocks on the head in which the trunnions are journaled, a vertical protractor on one side of said trunnions, a horizontal scale on said collar, an adjustable stop on the trough against which the instrument rests, and a clamp means encircling the instrument and the trough.

5. A calibrating and testing tool for bore hole surveying instruments, comprising a tubular stand, a collar in which the stand is journaled, leveling means on the collar, a head on the upper end of the stand, a V-shaped trough, trunnions projecting from the trough, bearing blocks on the head in which the trunnions are journaled, a vertical protractor on one side of said trunnions, a horizontal scale on said collar, said stand having a vertical opening in one side thereof adapted and arranged to receive the lower end of said trough, an adjustable stop on the trough against which the instrument rests, and a clamp means encircling the instrument and the trough.

6. A calibrating and testing tool for bore hole surveying instruments, comprising a tubular stand, a collar in which the stand is journaled, a ball bearing in the collar, said stand resting on the ball bearing, leveling means on the collar, a horizontal angle scale on the collar, a finger on the stand traversing said scale, a head on the upper end of the stand, a V-shaped trough, a pair of trunnions on the trough, bearing blocks on the head in which said trunnions are journaled, a vertical protractor secured to one of said trunnions whereby the vertical angle of the trough is ascertainable, said stand having a vertical opening therein adapted to receive the lower end of the trough, and clamp means encircling the instrument and the trough.

7. A calibrating and testing tool for bore hole surveying instruments, comprising a vertical stand, journal means for said stand whereby said stand may be rotated thru a horizontal angle, a head on the upper end of the stand, an instrument supporting trough, trunnions projecting from the trough, bearing blocks on the head on which the trunnions are journaled, clamp means whereby the instrument is held in the trough, means to indicate the movement of the trough in a vertical plane, means to indicate the movement of the stand in a horizontal plane, and a calibrated ring attached to the upper end of said trough.

HARLAN JOHN EASTMAN.